United States Patent
Keeling et al.

(10) Patent No.: US 9,248,751 B2
(45) Date of Patent: Feb. 2, 2016

(54) MIXED SEMICONDUCTOR H-BRIDGE POWER CONVERTERS AND METHODS RELATED THERETO

(71) Applicant: QUALCOMM Incorporated, San Diego, CA (US)

(72) Inventors: Nicholas Athol Keeling, Auckland (NZ); Michael Le Gallais Kissin, Auckland (NZ); Chang-Yu Huang, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/071,492

(22) Filed: Nov. 4, 2013

(65) Prior Publication Data
US 2014/0268895 A1    Sep. 18, 2014

Related U.S. Application Data

(60) Provisional application No. 61/799,417, filed on Mar. 15, 2013.

(51) Int. Cl.
*H02M 7/5387* (2007.01)
*B60L 11/18* (2006.01)
(Continued)

(52) U.S. Cl.
CPC ........... *B60L 11/182* (2013.01); *B60L 11/1825* (2013.01); *H02M 7/003* (2013.01); *H02M 7/219* (2013.01); *B60L 2210/30* (2013.01); *B60L 2210/40* (2013.01); *H02J 5/005* (2013.01); *H02J 7/025* (2013.01); *H02M 7/5387* (2013.01); *Y02T 10/7005* (2013.01)

(58) Field of Classification Search
CPC ............... H02M 2001/0067; H02M 2001/003; H02M 2007/4822; H02M 7/48; H02M 7/493; H02M 7/5387; H02M 7/77
USPC .............................. 363/65, 71, 123, 131, 132
See application file for complete search history.

(56) References Cited

U.S. PATENT DOCUMENTS 5,119,000 A    6/1992  Schultz
5,208,493 A *  5/1993  Lendaro et al. ............... 327/430
(Continued)

FOREIGN PATENT DOCUMENTS

| EP | 2256916 A1 | 12/2010 |
| JP | 2005057937 A | 3/2005 |
| WO | WO-0072433 A1 | 11/2000 |

OTHER PUBLICATIONS

International Search Report and Written Opinion—PCT/US2014/019600—ISA/EPO—Mar. 6, 2015.

*Primary Examiner* — Jue Zhang
*Assistant Examiner* — Lakaisha Jackson
(74) *Attorney, Agent, or Firm* — Knobbe Martens Olson & Bear LLP

(57) ABSTRACT

This disclosure provides systems, methods and apparatus for power converters and particularly power converters for wireless power transfer to remote systems such as electric vehicles. In one aspect, the disclosure provides an electronic power supply. The electronic power supply includes at least first and second half-bridge circuitries. The first half-bridge circuitry includes semiconductor material of a first type. The second half-bridge circuitry of the H-bridge includes semiconductor material of a second type. The first semiconductor material type is different from the second semiconductor material type.

20 Claims, 7 Drawing Sheets

(51) Int. Cl.
  H02M 7/00     (2006.01)
  H02M 7/219    (2006.01)
  *H02J 7/02*       (2006.01)
  *H02J 5/00*       (2006.01)

(56) References Cited

U.S. PATENT DOCUMENTS

| | | | |
|---|---|---|---|
| 5,661,644 A * | 8/1997 | Bergman et al. | 363/56.01 |
| 6,392,484 B1 | 5/2002 | Takita | |
| 6,617,913 B1 | 9/2003 | Johnson | |
| 8,278,892 B2 | 10/2012 | Friebe et al. | |
| 8,767,424 B2 * | 7/2014 | Kazama | 363/131 |
| 2009/0316457 A1 * | 12/2009 | Friebe | H02J 3/38 363/131 |
| 2011/0037321 A1 * | 2/2011 | Chatterjee | H04B 3/548 307/104 |
| 2012/0092905 A1 | 4/2012 | Srighakollapu et al. | |
| 2012/0099353 A1 * | 4/2012 | Azuma | H02M 7/49 363/71 |

* cited by examiner

MIXED SEMICONDUCTOR H-BRIDGE POWER CONVERTERS AND METHODS RELATED THERETO

CROSS-REFERENCE TO RELATED APPLICATIONS

The application claims the priority benefit of U.S. Provisional Application No. 61/799,417, titled "MIXED SEMICONDUCTOR H-BRIDGE POWER CONVERTERS AND METHODS RELATED THERETO," filed Mar. 15, 2013, the entirety of which is incorporated herein by reference.

FIELD

Embodiments of the invention relate to electronic devices, and more particularly, to H-bridge power converters.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems may be capable of transferring power in free space (e.g., via a wireless field) to be used to charge electric vehicles without physical connectors.

Wireless charging systems can have demanding power requirements. An H-bridge power converter can be used to generate a desired voltage by controlling a voltage or a current provided to a load through an inductor. For example, the two or more half-bridge circuitries can include one or more switches that are turned on and off to control a current into or out of the load. The duty cycle and/or timing of the switches can control the voltage level of the regulated voltage. Switching, however, can result in various types of power losses. Power supplies that are capable of providing an efficient power source for wireless power transmitter and/or receiver systems may overcome some of the deficiencies of wired charging solutions. As such, wireless charging systems and methods that efficiently and safely transfer power for charging electric vehicles are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an electronic power supply. The electronic power supply comprises a first half-bridge circuitry having semiconductor material of a first type. The electronic power supply further includes a second half-bridge circuitry having semiconductor material of a second type. The first semiconductor material type is different from the second semiconductor material type.

Another aspect of the disclosure provides an implementation of a method for switching an H-bridge circuit. The method includes switching off a first phase signal of the H-bridge circuit. The H-bridge circuit comprises a first diode of a first semiconductor material type and a second diode of a second semiconductor material type, the first semiconductor material type different from the second semiconductor material type. The method further includes attenuating a current produced by the switching off the first phase signal by passing the current through the first diode. The method further includes attenuating the current produced by the switching off the first phase signal by passing current through the second diode. The method further includes switching on a second phase signal of the H-bridge circuit.

Yet another aspect of the disclosure provides an H-bridge power converter for supplying power. The H-bridge power converter comprises first means for selectively connecting each of a first input power supply and a second input power supply to a first output power supply line. The H-bridge power converter further comprises second means for selectively connecting each of the first input power supply and the second input power supply to a second output power supply line. The second connecting means is configured to present a greater forward voltage drop than the first connecting means.

DETAILED DESCRIPTION OF EMBODIMENTS

Figure 1:
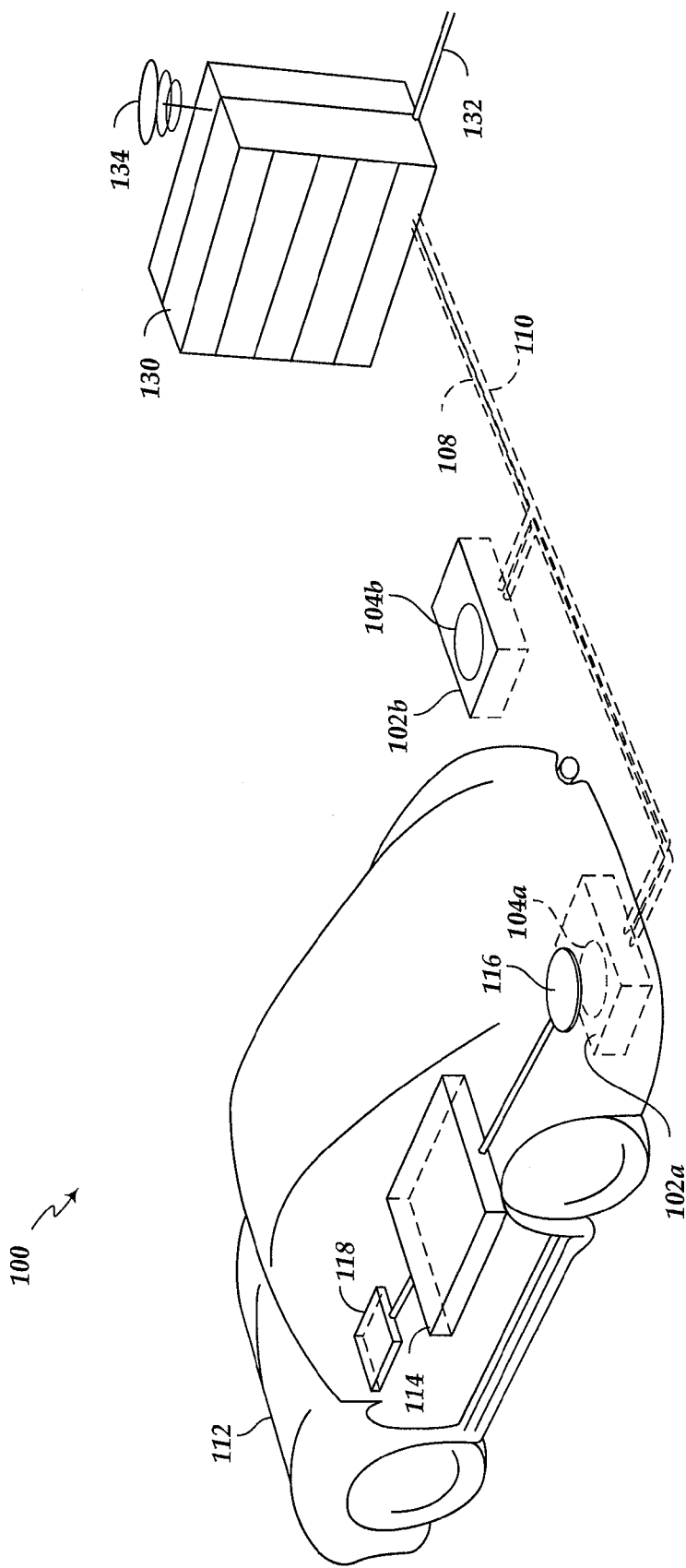
FIG. 1 is a diagram of an exemplary wireless power transfer system for charging an electric vehicle, in accordance with an exemplary embodiment.

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer. It will be understood that, throughout this specification, two components being "coupled" may refer to their interaction through direct or indirect ways, and may further refer to a physically connected (e.g., wired) coupling or a physically disconnected (e.g., wireless) coupling.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Inductive power transfer (IPT) systems are one way for the wireless transfer of energy. In IPT, a primary (or "transmitter") power device transmits power to a secondary (or "receiver") power receiver device. Each of the transmitter and receiver power devices include inductors, typically an arrangement of coils or windings of electric current conveying media. An alternating current in the primary inductor produces a fluctuating electromagnetic field. When the secondary inductor is placed in proximity to the primary inductor, the fluctuating electromagnetic field induces an electromotive force (EMF) in the secondary inductor, thereby transferring power to the secondary power receiver device.

In electric vehicle and plug-in hybrid vehicle IPT systems the primary power device may be situated on the ground and may be referred to as a "base" device or power pad. The secondary power device may be situated on the electric vehicle and may be referred to as a "pick-up" device or power pad. These devices are commonly used to transmit power from the base (transmitter) device to the pick-up (receiver) device. Some IPT systems are also able to function in a mode in which power is transferred the other way, i.e. from the pick-up device to the base device. In this mode, the pick-up device functions as the "primary" device and the base device functions as the "secondary" device because the pick-up induces an EMF in the base. This may allow power stored in an electric vehicle battery to be transferred back to a mains electricity grid.

In accordance with embodiments described herein, the IPT system may use resonant inductive coupling, in which power is transmitted between inductive coils that are tuned to resonate at substantially the same frequency. Resonant coupling may be achieved by adding inductive and/or capacitive elements in series or parallel with the induction coils or via selecting coils with a selected inherent capacitance (e.g., self-resonant).

FIG. 1 is a diagram of an exemplary wireless power transfer system 100 for charging an electric vehicle 112, in accordance with an exemplary embodiment. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $1/2\pi$ of wavelength of the base system induction coil 104a (and vice versa for the electric vehicle induction coil 116) as will be further described below.

Local distribution 130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In some embodiments, feedback may be generated by the wireless power transfer system 100, for example, electric vehicle 112 or a processor connected to a user interface of electric vehicle 112, or from a signal or sensor information that may be contained in the base wireless charging system 102a. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104*a*, or a combination thereof may have functionality for displacing and moving the induction coils 116 and 104*a* relative to each other to more accurately orient them and develop more efficient coupling therebetween.

The base wireless charging system 102*a* may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102*a* transfers power to the electric vehicle 112 and the electric vehicle 112 transfers power to the base wireless charging system 102*a* e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

It will be therefore understood that the terms "transmitter," "receiver," "primary," and "secondary" and the like are used herein to refer to the uses of the components of the wireless power transfer system when used for transferring power from the power supply to the electric vehicle, i.e. from the transmitter or primary device to the receiver or secondary device. However, the wireless power transfer system may involve the use of these components to transfer some power, which in some embodiments may only be a small amount, in the opposite direction, for example to transfer energy from the electric vehicle to the power distribution grid, as part of a process to improve alignment of the transmitter and receiver devices, or to identify which transmitter device is appropriately placed for transferring power to the receiver device. Therefore the "transmitter" may also be used to receive power and the "receiver" may also be used to transmit power. The use of these terms, although referring to the normal sense of operation of certain components of the system for ease of understanding, does not limit embodiments to any particular operation of such components.

Figure 2:
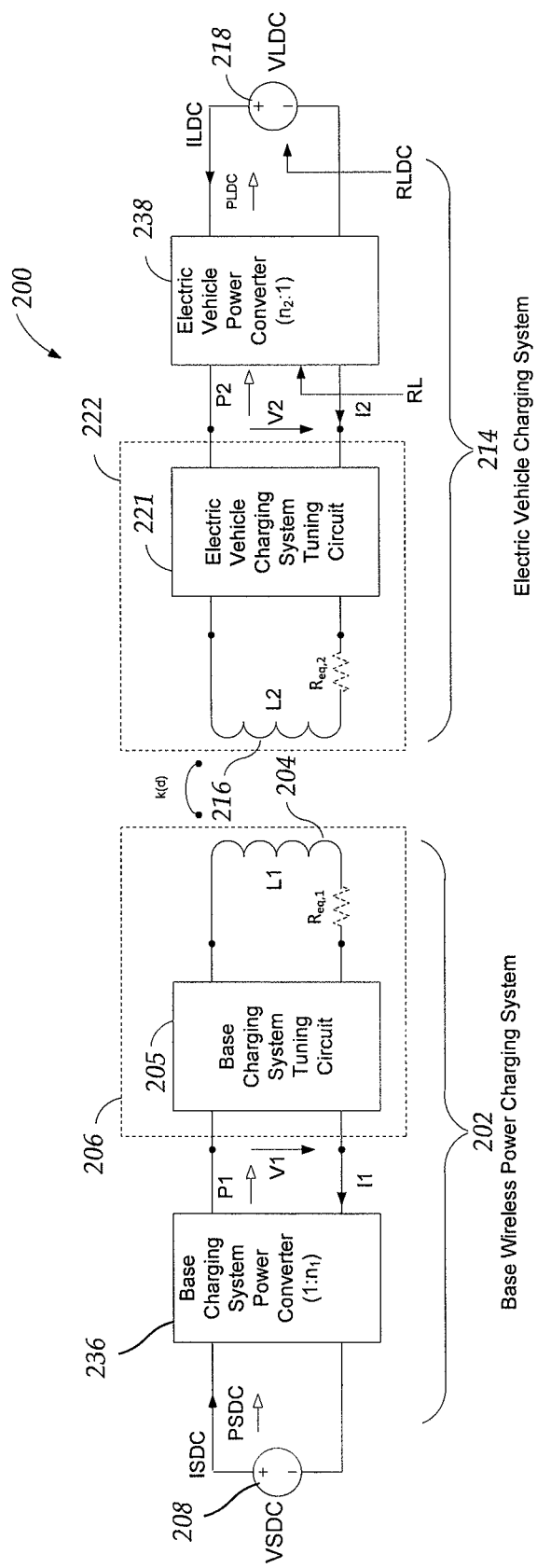
FIG. 2 is a schematic diagram of exemplary components of the wireless power transfer system of FIG. 1.

FIG. 2 is a schematic diagram of exemplary components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, a capacitor may be added or may be integrated with the induction coil, and arranged to be in series with the induction coil to create a resonant circuit (e.g., the base system transmit circuit 206) that generates an electromagnetic field. Accordingly, for larger diameter induction coils, the value of capacitance for inducing resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil.

Coils adapted for use in resonant structures may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102*a*.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. One example type of circuitry of various embodiments of the base wireless power converter 236 is an H-bridge circuit. H-bridge power converters are described in greater detail later in connection with FIG. 3.

The base charging system power converter 236 supplies power $P_1$ to the base system transmit circuit 206 including a base charging system tuning circuit 205 which may consist of reactive tuning components in a series or parallel configuration or a combination of both with the base system induction coil 204 to emit an electromagnetic field at a desired frequency. The capacitor $C_1$ (not shown) may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

Both the base system transmit circuit 206, which includes the base system induction coil 204, and the electric vehicle receive circuit 222, which includes the electric vehicle induction coil 216, may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including an electric vehicle charging system tuning circuit 221 and electric vehicle induction coil 216. The electric vehicle charging system tuning circuit 221 may be provided to form a resonant circuit with the electric vehicle induction coil 216 that resonates at a desired frequency. The mutual coupling coefficient resulting at coil separation is represented by element k(d). Equivalent resistances $R_{eq,1}$ and $R_{eq,2}$ represent the losses that may be inherent to the induction coils 204 and 216 and any anti-reactance capacitors that may, in some embodiments, be provided in the base charging system tuning circuit 205 and electric vehicle charging system tuning circuit 221 respectively. The electric vehicle receive circuit 222 including the electric vehicle induction coil 216 and electric vehicle charging system tuning circuit 221 receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. One example type of circuitry of various embodiments of the electric vehicle power converter 238 is an H-bridge circuit. H-bridge power converters are described in greater detail later in connection with FIG. 3.

The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to decouple the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same, energy is transferred highly efficiently. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

In this specification the term "coil" is used in the sense of a localized winding arrangement having a number of turns of electrically conducting material that all wind around one or more central points. The term "coil arrangement" is used to mean any winding arrangement of conducting material, which may comprise a number of "coils."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

As described above, according to some embodiments, coupling power between two induction coils that are in the near field of one another is disclosed. As described above, the near field may correspond to a region around the induction coil in which electromagnetic fields exist. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
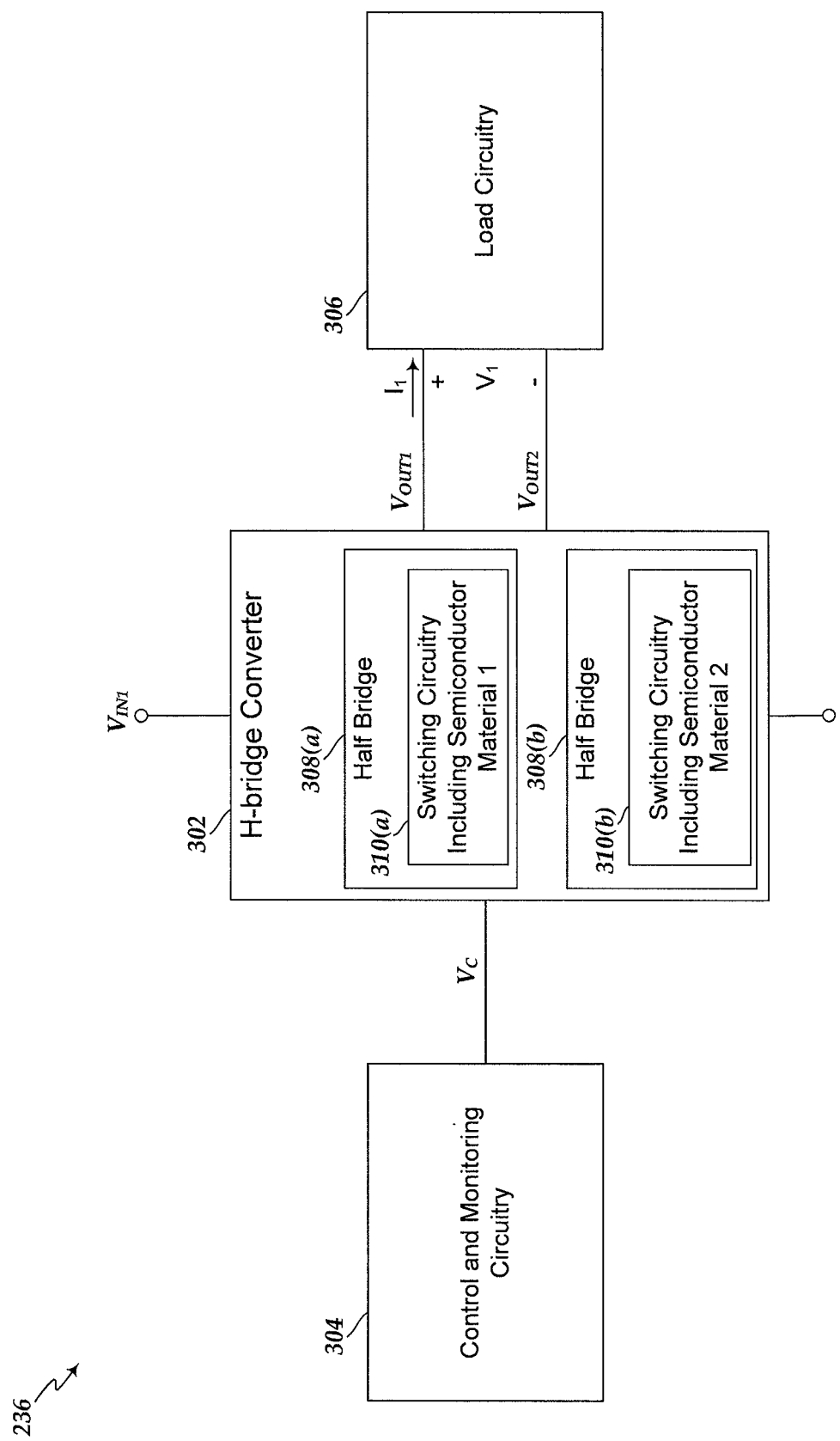
FIG. 3 is a schematic block diagram of one embodiment of the power converter of FIG. 2.

FIG. 3 is a schematic block diagram of one embodiment of the base charging system power converter 236 of FIG. 2. Embodiments relate to and are described in the context of systems and methods for H-bridge power converters for IPT and will be applicable to other types of H-bridge power converters, such as H-bridge converters adapted for general purpose applications. Additionally, embodiments relate to and are described below in the context of systems and methods for H-bridge power converters for wireless power transmitters will be applicable to other types of H-bridge power converters, such as H-bridge converters adapted for wireless power receivers (for example, the electric vehicle power converter 238 of FIG. 2).

The base charging system power converter 236 includes an H-bridge converter 302, a control and monitoring circuitry 204, and a load circuitry 306, such as the base system transmit circuit 206 (or, on the wireless power receiver side, the electric vehicle battery unit 218) of FIG. 2. The H-bridge converter 302 includes one or more half-bridge circuitries, such as a first half-bridge circuitry 308(a) and a second half-bridge circuitry 308(b). The first half-bridge circuitry 308(a) includes a first switching circuitry 310(a). The second half-bridge circuitry 308(b) includes a second switching circuitry 310(b).

The control and monitoring circuitry 304 generates a control signal $V_C$ for operating the H-bridge converter 302. For example, the control signal $V_C$ can control the switching of the one or more half-bridge circuitries 308(a), 308(b) of the H-bridge converter 302 to generate a desired voltage or current for the load 306. Examples of the control signal Vc includes current and voltage signals. The control and monitoring circuitry 304 can correspond to hardware, including one or more processors executing instructions stored on a computer readable medium.

The H-bridge converter 302 receives the control signal $V_C$ as an input and generates first and second output power supplies $V_{OUT1}$ and $V_{OUT2}$ as outputs. Additionally, the H-bridge 302 receives a first input power supply $V_{IN1}$ and a second input power supply $V_{IN2}$ as inputs. In the illustrated embodiment, the H-bridge converter 302 switches the first half-bridge circuitry 308(a) and the second half-bridge circuitry 308(b) in accordance with the control signal $V_C$. The timing of the switches and/or the duty cycle can control the voltage/current levels generated at the output power supplies $V_{OUT1}$, $V_{OUT2}$ of the H-bridge converter 302.

In one embodiment, the first switching circuitry 310(a) of the first half-bridge circuitry 308(a) is operatively disposed between the first input power supply $V_{IN1}$ and the first output power supply $V_{OUT1}$. For example, the first switching circuitry 310(a) can be configured to selectively couple the first input power supply $V_{IN1}$ to the first output power supply $V_{OUT1}$, in accordance with the control signal $V_C$. Additionally, the second switching circuitry 310(b) of the second half-bridge circuitry 308(b) is operatively disposed between the first input power supply $V_{IN1}$ or the second input power supply $T_{IN1}$ and the second output power supply $V_{OUT2}$. For example, the second switching circuitry 310(b) can be configured as a switch to selectively couple the first input power supply $V_{IN1}$ to the second output power supply $V_{OUT2}$, in accordance with the control signal $V_C$. As another example, the second switching circuitry 310(b) can be configured as a switch to selectively couple the second input power supply $V_{IN2}$ to the second output power supply $V_{OUT2}$, in accordance with the control signal $V_C$.

The first and/or second switching circuitries 310(a), 310(b) can correspond to semiconductor switches, such as insulated gate field-effect transistors. One example is a MOSFET. However, it will be understood that a gate can be made from materials other than metals, such as polysilicon, and an insulation layer can be made out of materials other than silicon oxide, such as a high k dielectric. It will also be understood that the transistors can have various structural types other than MOSFETs, including, but not limited to, BJT, JFET, IGFET, MESFET, pHEMT, HBT, and the like transistor structural types.

Additionally or alternatively, the first and/or second switching circuitries 310(a), 310(b) can correspond to diodes, such as junction diodes. One example is a p-n semiconductor junction diode. However, it will be understood that a junction can be made from materials other than semiconductors, such as metal-semiconductor junctions (for example, Schottky diodes and the like). It will also be understood that the diodes can be implemented with a diode-connected transistor, including, but not limited to, transistors having a BJT, JFET, IGFET, MESFET, pHEMT, HBT, or the like transistor structural types.

The first switching circuitry 310(a) includes semiconductor material of a first type. The second switching circuitry 310(b) includes semiconductor material of a second type, wherein the first type is different from the second type. Examples of types of semiconductor material include materials that have electrical resistivity between that of a conductor and an insulator. Non-limiting examples of specific types of semiconductor materials include silicon (Si), silicon carbide (SiC), gallium nitride (GaN), and the like materials. Other types of semiconductor material will be readily determinable.

In one embodiment, a specific type of semiconductor material can include the intrinsic semiconductor material as well as doped versions (or polarities) of the intrinsic semiconductor material. In other words, different types of semiconductor material differ by more than polarity types and dopants. For example, the semiconductor material type of Si can include intrinsic Si, n-type Si (for example, Si doped with phosphorus, arsenic, or the like), and p-type Si (for example, Si doped with boron, gallium, or the like). For another example, the semiconductor material type of SiC can include intrinsic SiC, n-type SiC (for example, SiC doped with nitrogen, phosphorus, or the like), and p-type SiC (for example, SiC doped with aluminum, boron, gallium, beryllium, or the like). For yet another example, the semiconductor material type of GaN can include intrinsic GaN, n-type GaN (for example, GaN doped with silicon, oxygen, or the like), and p-type SiC (for example, GaN doped with magnesium or the like). It will be appreciated that Si, SiC, and GaN are different types of semiconductor material.

In one embodiment, the first switching circuitry 310(*a*) can be a device formed from a first semiconductor substrate. The second switching circuitry 310(*b*) can be a device formed from a second semiconductor substrate, wherein the first and second semiconductors substrates include different types of semiconductor materials. For example, the first switching circuitry 310(*a*) can be formed from a Si substrate, whereas the second switching circuitry 310(*b*) can be formed from a SiC or GaN substrate. Other semiconductor substrate types will be readily determinable.

In another embodiment, the first switching circuitry 310(*a*) is a device formed from a first type of pure semiconductor crystalline material. The second switching circuitry 310(*b*) can be formed from a second type of pure semiconductor crystalline material, wherein the first and second types are different. For example, the first switching circuitry 310(*a*) can be formed by adding dopant to an intrinsic crystalline Si, whereas the second device can be formed by adding dopant to intrinsic crystalline SiC or GaN.

Devices made from certain types of (intrinsic or doped) semiconductor materials, substrates, and/or crystals (below, collectively referred to as "material") possess particular electrical characteristics. A first example electrical property is forward voltage drop. An example of forward voltage drop is a voltage drop across a junction formed by the semiconductor material when the junction forward biases and conducts current. For example, a Si junction (e.g., forming a part of a power device, such as a diode) can have a forward voltage drop of about 1 volt (V) to about 2 V. A SiC junction can have a forward voltage drop of about 1.6 V to about 2.5 V. Forward voltage drop may increase conduction losses in a semiconductor device.

In one embodiment, the semiconductor material of the first type can have a lower forward voltage drop than semiconductor material of the second type. For example, the semiconductor material of the first type can include Si, and the semiconductor material of the second type can include SiC or GaN. As a non-limiting example, the first half-bridge circuitry 308(*a*) can include a p-n junction formed from doped Si, and the second half-bridge circuitry 308(*b*) can include a p-n junction formed from doped SiC or doped GaN.

A second example electrical property is reverse recovery charge. An example of reverse recovery charge is a charge that would be stored within a junction formed by the semiconductor material when switched from a forward current of 0.5 amperes (A) to a reverse current of 1.0 A. For example, a Si p-n junction (for example, a diode) can have a reverse recovery charge of about 0.2 microcoulomb to about 1 microcoulomb. A SiC p-n junction and a GaN p-n junction can each have a reverse recovery charge less than a Si p-n junction. In some embodiments, reverse recovery charge may be difficult to determine or measure, for instance, in the case of SiC or GaN where reverse recovery charge is low. It may however be possible to determine the total capacitive charge of the material, and total capacitive charge should be greater than reverse recovery charge. A SiC p-n junction and a GaN p-n junction can each have a total capacitive charge in the range of about 8 nanocoulomb to about 550 nanocoulomb. Accordingly, a SiC p-n junction and a GaN p-n junction can each have a reverse recovery charge less than about 8 nanocoulomb to about 550 nanocoulomb. Reverse recovery charge may increase commutation (switching) losses in a semiconductor device.

In one embodiment, the semiconductor material of a first type can have a higher reverse recovery charge than semiconductor material of the second type. For example, the semiconductor material of the first type can include Si, and the semiconductor material of the second type can include SiC or GaN. As a non-limiting example, the first half-bridge circuitry 308(*a*) can include a junction formed from doped Si, and the second half-bridge circuitry 308(*b*) can include a junction formed from doped SiC or doped GaN.

A third example electrical property is bandgap. In some embodiments, the semiconductor material of the first type can have a lower bandgap than semiconductor material of the second type. In certain embodiments, the semiconductor material of the first type can have a bandgap of about or less than 1.7 electronvolt (eV), and the semiconductor material of the second type can have a bandgap greater than 1.7 eV. As a non-limiting example, the first half-bridge circuitry 308(*a*) can include a semiconductor material formed from a Si substrate, and the second half-bridge circuitry 308(*b*) can include a semiconductor material formed from a SiC or GaN substrate. It will be appreciated that Si has a bandgap of about 1.1 eV; SiC has a bandgap of greater than about 2.3 eV; and GaN has a bandgap of about 3.4 eV. Larger bandgaps may increase conduction losses in a semiconductor device.

Including first and second types of semiconductor material may provide numerous benefits. For example, various semiconductor materials may reduce different power losses. For example, conduction loss may be reduced by implementing a portion of the H-bridge converter 302 (for example the first device 308(*a*)) that would otherwise create high conduction losses with a semiconductor material of a type having low forward voltage drop. Alternatively or additionally, commutation losses can be reduced by implementing a portion of the H-bridge converter 302 (for example the second device 308(*b*)) that would otherwise create relatively high commutation losses with semiconductor of a type having relatively low reverse recovery charge.

Figure 4:
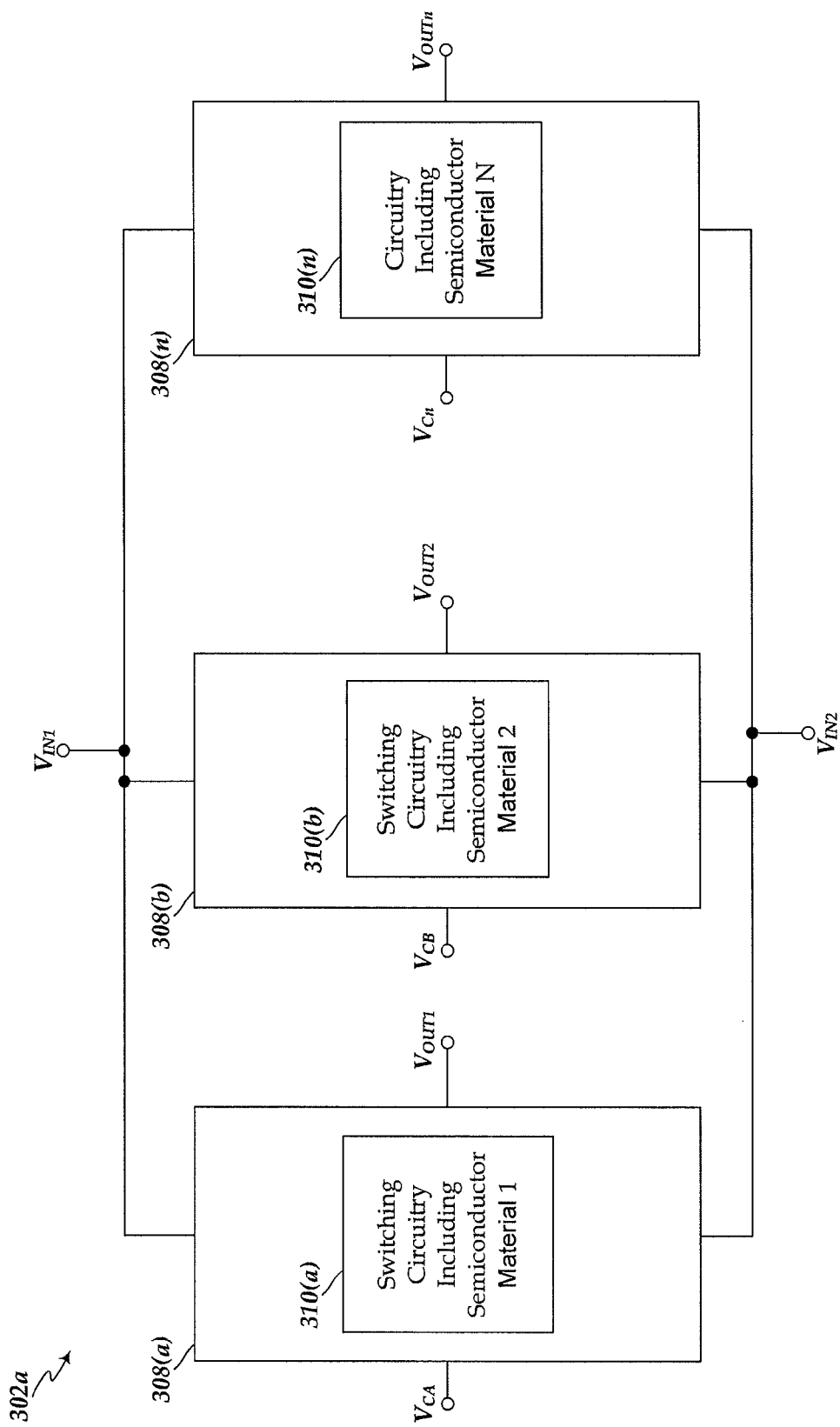
FIG. 4 is a schematic block diagram illustrating of one embodiment of the H-bridge converter of FIG. 3.

FIG. 4 is a schematic block diagram illustrating of one embodiment of the H-bridge converter 302*a* of FIG. 3. The H-bridge converter 302*a* includes n half-bridge circuitries 308(*a*), . . . , 308(*n*). Each of the half-bridge circuitry 308(*a*), . . . , 308(*n*) includes a switching circuitry 310(*a*), . . . , 310(*n*). A half-bridge can be referred to a "leg" or a "pole" of an H-bridge circuit. The first half-bridge circuitry 308(*a*) receives the first and second input power supplies $V_{IN1}$, $V_{IN2}$ as inputs and generates the first output power supply $V_{OUT1}$ based on the control signal $V_{CA}$. Similarly, the second half-bridge circuitry 308(*b*) receives the first and second input power supplies $V_{IN1}$, $V_{IN2}$ as inputs and generates the second output power supply $V_{OUT2}$ based on the control signal $V_{CB}$. The n-th half-bridge circuitry $308(n)$ receives the first and second input power supplies $V_{IN1}$, $V_{IN2}$ as inputs and generates the first output power supply $V_{OUTn}$ based on the control signal $V_{Cn}$.

For example, the switching circuitries $310(a), \ldots, 310(n)$ can correspond to transistors, diodes, resistors, inductors, and the like electronic components interconnected by conductors such as a metallic wire. In operation, the switching circuitries $310(a), \ldots, 310(n)$ can perform functions related to generating and regulating the corresponding output power supplies $V_{OUT1}, \ldots, V_{OUTn}$ based on the corresponding control signals $V_{CA}, V_{CB}, \ldots, V_{Cn}$.

Each of the switching circuitries $310(a), \ldots, 310(n)$ of the half-bridge circuitries $308(a), \ldots, 308(n)$ includes semiconductor material. In particular, as stated previously in connection with FIG. 3, the first switching circuitry $310(a)$ includes semiconductor material of a first type. The second switching circuitry $310(b)$ includes semiconductor material of a second type. The first type is different from the second type. For example, the first type can be Si and the second type can be SiC. The n-th switching circuitry $310(n)$ includes semiconductor of an n-th type. The n-th type can correspond to the first type, the second type, or a third, distinct type.

Figure 5:
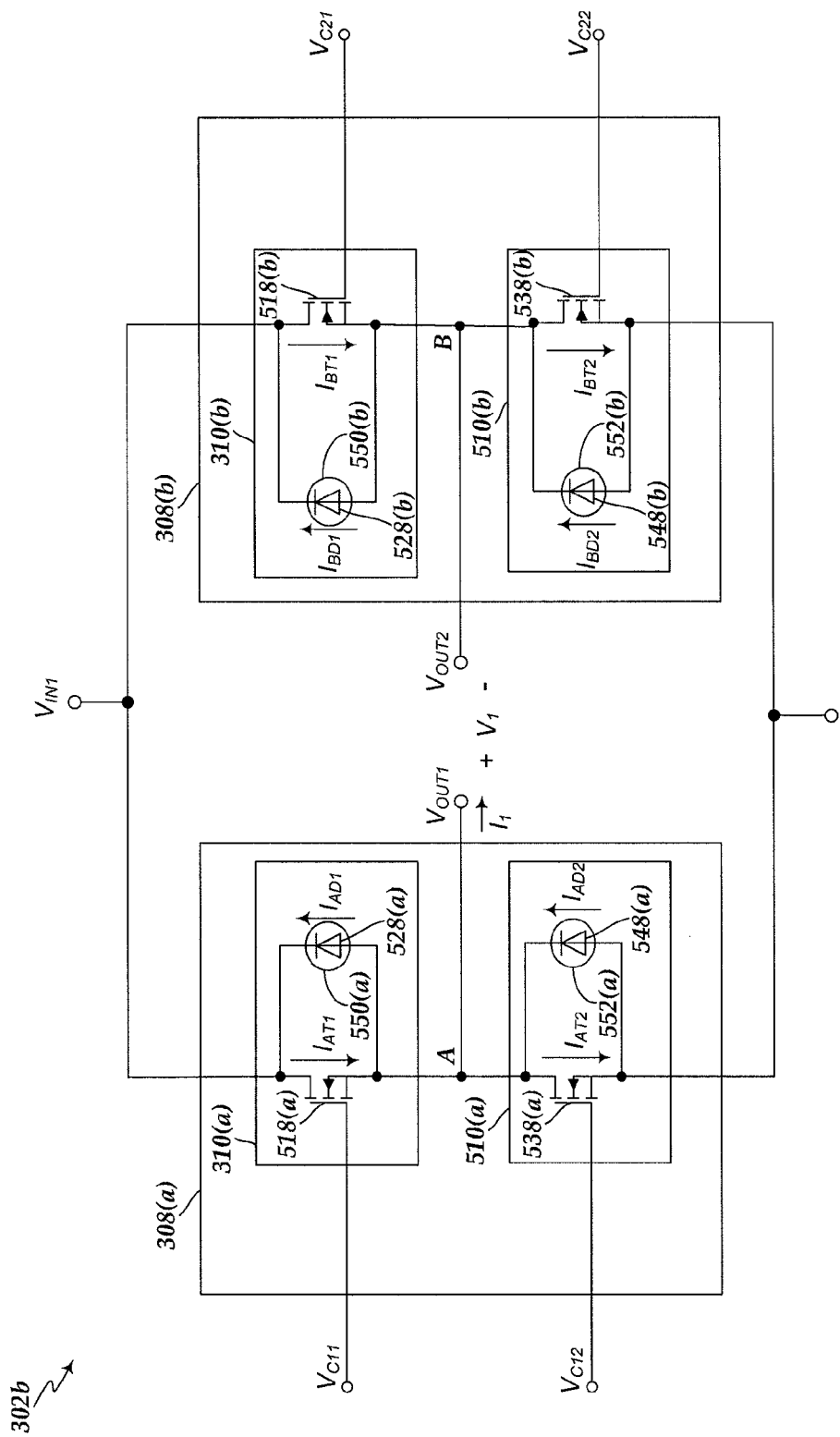
FIG. 5 is a schematic block diagram illustrating of another embodiment of the H-bridge converter of FIG. 3.

FIG. 5 is a schematic block diagram illustrating of a specific embodiment of the H-bridge converter $302b$ of FIG. 3. The H-bridge converter $302b$ includes the first and second half-bridge circuitries $308(a)$, $308(b)$. Each of the first and second half-bridge circuitries $308(a)$, $308(b)$ includes first and second switching circuitries $310(a)$, $510(a)$, $310(b)$, $510(b)$. The first switching circuitry $310(a)$ of the first half-bridge circuitry $308(a)$ includes a transistor $518(a)$ and a diode $528(a)$. The second switching circuit $510(a)$ of the first half-bridge circuitry $308(a)$ includes a transistor $538(a)$ and a diode $548(a)$. The first switching circuitry $310(b)$ of the second half-bridge circuitry $308(b)$ includes a transistor $518(b)$ and a diode $528(b)$. The second switching circuitry $510(b)$ of the first half-bridge circuitry $308(b)$ includes a transistor $538(b)$ and a diode $548(b)$. The switching circuitries $310(a)$, $310(b)$, $510(a)$, $510(b)$ include corresponding semiconductor material $550(a)$, $550(b)$, $552(a)$, $552(b)$.

The transistors $518(a)$, $518(b)$ are referred to as high-side switches. The transistors $538(a)$, $538(b)$ are referred to as low-side switches.

As stated, the first half-bridge circuitry $308(a)$ receives the first and second input power supplies $V_{IN1}$, $V_{IN2}$ as inputs and generates the first output power supply $V_{OUT1}$ as an output. Additionally, the first half-bridge circuitry $308(a)$ receives the control $V_{CA}$ as an input, which includes a first control component $V_{C11}$ and a second control component $V_{C12}$. For example, the first and second control components $V_{C11}$ and $V_{C12}$ can open or close the first and second switching circuitries $310(a)$ and $510(a)$ to selectively provide the first input power supply $V_{IN1}$, the second power supply $V_{IN2}$, or no power supply as the first output power supply $V_{OUT1}$.

The second half-bridge circuitry $308(b)$ receives the first and second input power supplies $V_{IN1}$, $V_{IN2}$ as inputs and generates the second output power supply $V_{OUT2}$ as an output. Additionally, the second half-bridge circuitry $308(b)$ receives the control $V_{CB}$ as an input, which includes a third control component $V_{C21}$ and a fourth control component $V_{C22}$. For example, the third and fourth control components $V_{C21}$ and $V_{C22}$ can open or close the switching circuitries $310(b)$ and $510(b)$ of the second half-bridge circuitry for selectively providing the first input power supply $V_{IN1}$, the second power supply $V_{IN2}$, or no power supply as the second output power supply $V_{OUT2}$.

The transistor $518(a)$ of the first switching circuitry $310(a)$ receives the first control component $V_{C11}$ as input and selectively couples the first input power supply $V_{IN1}$ to a Node A. When closed, the transistor $518(a)$ can carry a current $I_{AT1}$ across its drain and source terminals to the Node A. The transistor $538(a)$ of the second switching circuitry $510(a)$ receives the second control component $V_{C12}$ as input and selectively couples the input power supply $V_{IN2}$ to the Node A in accordance with the second control component $V_{C12}$. When closed, the transistor $538(a)$ can carry a current $I_{AT2}$ across its drain and source terminals to the Node A. The total switch current of the first half-bridge circuitry $308(a)$ will be denoted as $I_{AT}$ (for example, $I_{AT}=I_{AT2}-I_{AT1}$). The first output power supply $V_{OUT1}$ can be coupled to either the first input power supply $V_{IN1}$, the second input power supply $V_{IN2}$, or neither based on the control signals $V_{C11}$, $V_{C12}$ (but both switching circuitries $310(a)$, $510(a)$ being on at the same time can be an invalid/forbidden combination). As will be described in detail below, the diodes $528(a)$, $548(a)$ can correspond to flyback diodes and are configured to attenuate flyback produced by an inductive load after switching. During flyback attenuation, a forward current $I_{AD1}$ can be carried across the diode $528(a)$ and/or a current $I_{AD2}$ can be carried across $548(a)$. The total current running through the diodes $528(a)$, $548(a)$ of the first half-bridge circuitry $308(a)$ can be denoted as $I_{AD}$ (for example, $I_{AD}=I_{AD1}-I_{AD2}$).

The high-side transistor $518(b)$ of the second switching circuitry $310(b)$ receives the third control component $V_{C21}$ as input and selectively couples the first input power supply $V_{IN1}$ to a Node B. When closed, the transistor $518(b)$ can carry a current $I_{BT1}$ across its drain and source terminals to the Node B. The transistor $538(b)$ of the second switching circuitry $510(b)$ receives the fourth control component $V_{C22}$ as input and selectively couples the input power supply $V_{IN2}$ to the Node B in accordance with the fourth control component $V_{C22}$. When closed, the transistor $538(b)$ can carry a current $I_{BT2}$ across its drain and source terminals to the Node B. The total switch current of the second half-bridge circuitry $308(b)$ will be denoted as $I_{BT}$ (for example, $I_{BT}=I_{BT1}-I_{BT2}$). The second output power supply $V_{OUT2}$ can be coupled to either the first input power supply $V_{IN1}$, the second input power supply $V_{IN2}$, or neither (but both switching circuitries $310(b)$, $510(b)$ being on at the same time can be an invalid/forbidden combination). The diodes $528(b)$, $548(b)$ can correspond to flyback diodes and are configured to attenuate flyback produced by an inductive load after switching. To attenuate flyback, a current $I_{BD1}$ can be carried across the diode $528(b)$ and a current $I_{BD2}$ can be carried across $548(b)$. The total current running through the diodes $528(b)$, $548(b)$ of the second half-bridge circuitry $308(b)$ can be denoted as $I_{BD}$ (for example, $I_{BD}=I_{BD2}-I_{BD1}$).

A load can be connected to the output lines of the output power supplies $V_{OUT1}$ and $V_{OUT2}$ to receive an output voltage $V_1=V_{OUT1}-V_{OUT2}$ and an output current $I_1$. It will be appreciated that the H-bridge converter $302b$ can be interconnected with the load with other applicable polarities. For example, the connections of the output power supplies $V_{OUT1}$ and $V_{OUT2}$ with the load can be reversed to drive the load with an output signal $V_O=-V_1=V_{OUT2}-V_{OUT1}$, as described in greater detail below in connection with FIG. 6.

As stated, the first half-bridge circuitry $308(a)$ and the second half-bridge circuitry $308(b)$ include at least two different types of semiconductor material. In the illustrated embodiment, each of the diodes $528(a)$, $528(b)$, $548(a)$, $548(b)$ includes one of the semiconductor material $550(a)$, $550(b)$, $552(a)$, $552(b)$. In particular, the diode $528(a)$ of the first switching circuitry $308(a)$ includes the semiconductor material 550(a) of a first type. In one embodiment, at least one of the semiconductor materials 550(b), 552(b) of the diodes of the second half-bridge circuitry 308(b) is of a different, second type. For example, the first type can correspond to Si and the second type can correspond to SiC or GaN. In one specific embodiment, the diodes 528(a), 548(a) of the first half-bridge circuitry 308(a) both include semiconductor material of the first type, and the diodes 528(b), 548(b) of the second half-bridge circuitry 308(b) both include semiconductor material of the second type. Selection of the material type can be based on run-time characteristics of the components, as described in further detail below in connection with FIG. 6.

As described above, embodiments relate to and are described in the context of semiconductor materials for flyback diodes of H-bridge power converters, but it will also be applicable to semiconductor materials for other types of H-bridge power components, such as the transistors 518(a), 518(b), 538(a), 538(b). For example, in one embodiment, at least one of the transistors 518(a), 538(a) of the first half-bridge circuitry 308(b) includes semiconductor material of a first type, and at least one of the transistors 518(b), 538(b) of the second half-bridge circuitry 308(b) includes semiconductor material of a second type that is different from the first type.

Figure 6:
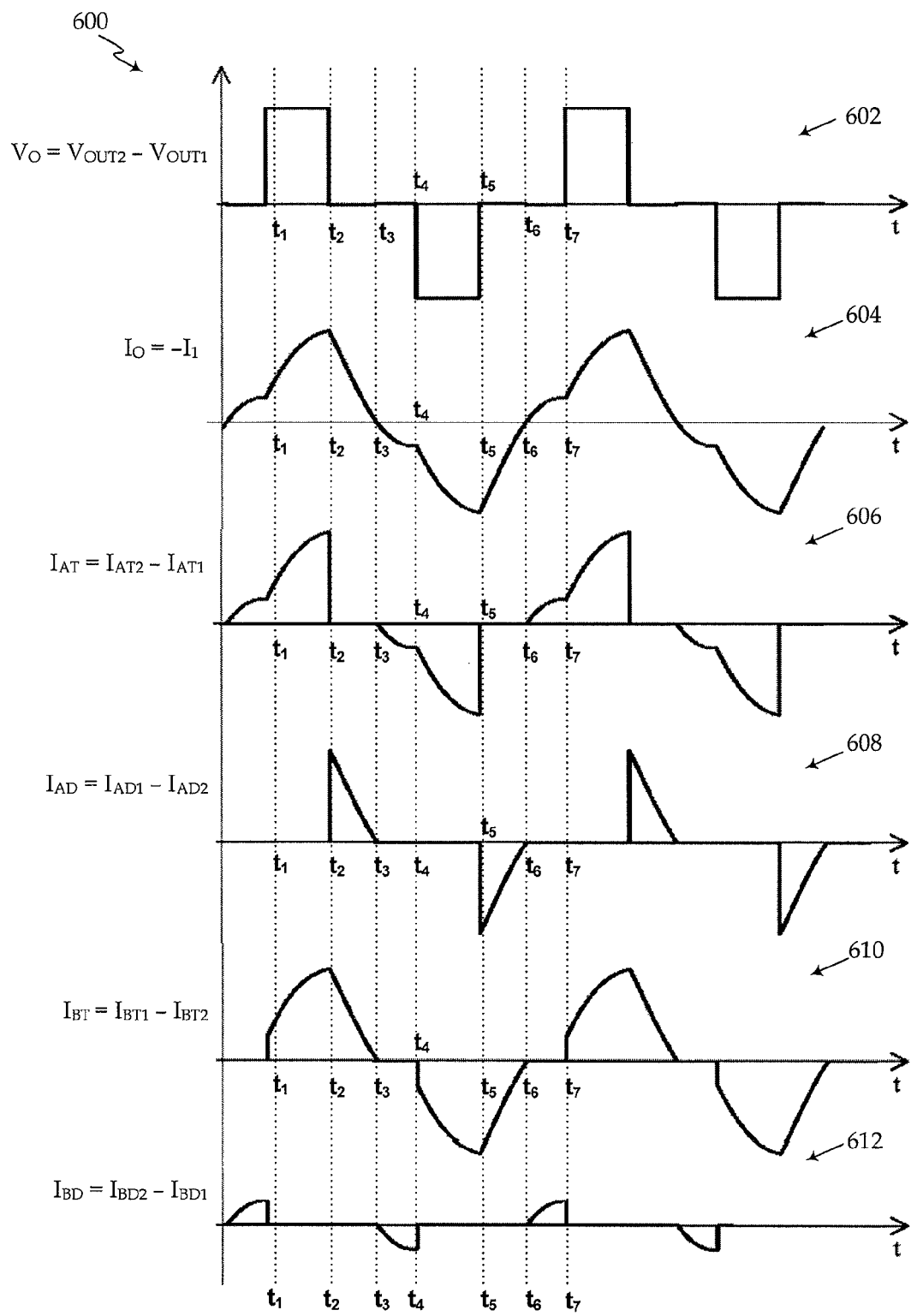
FIG. 6 are plots illustrating simulation results generated with a computer model of the H-bridge converter of FIG. 3.

FIG. 6 are plots illustrating simulation results 600 generated with a computer model of the H-bridge converter 302b of FIG. 5. The plotted quantities $V_O$, $I_O$, $I_{AT}$, $I_{AD}$, $I_{BT}$, $I_{BD}$ are with reference to FIG. 5 with a load interconnecting the outputs $V_{OUT1}$ and $V_{OUT2}$. In particular, the first plot 602 represents an output voltage $V_O$ (for example, $V_O = V_{OUT2} - V_{OUT1}$) versus time; the second plot 604 represents the output current $I_O$ (e.g., a current flowing through the load from the second output $V_{OUT2}$ to the first output $V_{OUT1}$) versus time; the third plot 606 represents the transistor current $I_{AT}$ (for example, $I_{AT} = I_{AT2} - I_{AT1}$) of the first half-bridge circuitry 308(a) versus time; the fourth plot 608 represents the diode current $I_{AD}$ (for example, $I_{AD} = I_{AD1} - I_{AD2}$) of the first half-bridge circuitry 308(a) versus time; the fifth plot 610 represents the transistor current $I_{BT}$ (for example, $I_{BT} = I_{BT1} - I_{BT2}$) of the second half-bridge circuitry 308(b) versus time; the sixth plot 612 represents the total diode current $I_{BD}$ (for example, $I_{BD} = I_{BD2} - I_{BD1}$) of the second half-bridge circuitry 308(b) versus time.

At time $t_1$, the H-bridge converter generates a first phase of the output voltage $V_O$. For example, with reference to FIG. 5, the H-bridge 302b can generate the first phase by driving the high-side transistor 518(b) of the second half-bridge circuitry 308(b) and the low-side transistor 538(a) of the first half-bridge circuitry 308(a) to an on state (for example, a "closed" or "activated" state), and driving the remaining transistors to an off state (for example, an "open" or "deactivated" state). Accordingly, the H-bridge converter 302b is configured to couple the first output power supply $V_{OUT1}$ and the second input power supply $V_{IN2}$, and is further configured to couple the second output power supply $V_{OUT2}$ and the first input power supply $V_{IN1}$. It will be appreciated that prior to time $t_1$ and generating the first phase that the high-side transistor 518(a) of the first half-bridge circuitry 308(a) can be in the off state, the low-side transistor 538(a) of the first half-bridge circuitry 308(a) can be in the on state, the high-side transistor 518(b) of the second half-bridge circuitry 308(b) can be in the off state (and then subsequently switched on), and the low-side transistor 538(b) of the second half-bridge circuitry 308(b) can be in the on state (and then subsequently switched off).

At time $t_2$, the first phase of the output voltage $V_O$ is switched off by opening the low-side transistor 538(a) of the first half-bridge circuitry 308(a) and closing the high-side transistor 518(a) of the first half-bridge circuitry 308(a). Switching the first phase off can cause a flyback current to flow through the high-side diode 528(a) of the first half-bridge circuitry 308(a) and through the high-side transistor 518(b) of the second half-bridge circuitry 308(b). For example, FIG. 6 shows that currents $I_{AD}$ and $I_{BT}$ are activated between times $t_2$ and $t_3$. Because the magnitude of $I_{AD}$ is relatively large during at least a portion of the time between times $t_2$ and $t_3$, the high-side diode 528(a) of the first half-bridge circuitry 308(a) can generate conduction loss.

Eventually the flyback current can reverse direction, for example, at time $t_3$. If the flyback current reverses, the high-side transistor 518(a) of the first half-bridge circuitry 308(a) can conduct the current $I_{AT}$ and the high-side diode 528(b) of the second half-bridge circuitry 308(b) can conduct the current $I_{BD}$. At this point, flyback can be at least partially attenuated and the current $I_{BD}$ can be relatively small. As such, the high-side diode 528(b) can cause a small amount of conduction loss compared to the high-side diode 528(a).

At time $t_4$, the H-bridge converter 302b generates a second phase of the output voltage $V_O$. For example, the H-bridge converter 302b can generate the second phase by switching off the high-side-transistor 518(b) of the second half-bridge circuitry 308(b) and switching on the low-side transistor 538(b) of the second half-bridge circuitry 308(b). Accordingly, the H-bridge converter 302b is configured to couple the first output power supply $V_{OUT1}$ and the first input power supply $V_{IN1}$, and is configured to couple the second output power supply $V_{OUT2}$ and the second input power supply $V_{IN2}$. In the illustrated embodiment, the high-side diode 528(b) of the second half-bridge circuitry 308(b) abruptly turns off while conducting the current $I_{BD}$. As a result, the high-side diode 528(b) of the first half-bridge circuitry 308(a) may create commutation loss.

At time $t_5$, the second phase of the output voltage $V_O$ is switched off by closing the high-side transistor 518(a) of the first half-bridge circuitry 308(a) and opening the low-side transistor 538(a) of the first half-bridge circuitry 308(a). Switching the first phase off can cause a flyback current to flow through the low-side diode 548(a) of the first half-bridge circuitry 308(a) and the low-side transistor 538(b) of the second half-bridge circuitry 308(b). For example, FIG. 6 shows that currents $I_{AD}$ and $I_{BT}$ can have relatively large magnitudes after time $t_5$. Because the magnitude of $I_{AD}$ is relatively large during at least a portion of the time between $t_5$ and $t_6$, the low-side diode 548(a) of the first half-bridge circuitry 308(a) can generate conduction loss.

The flyback current can eventually reverse direction, for example, at time $t_6$. If the flyback current reverses direction, the low-side transistor 538(a) of the first half-bridge circuitry 308(a) can conduct the current $I_{AT}$ and low-side diode 548(b) of the second half-bridge circuitry 308(b) can conduct the current $I_{BD}$. At this point, flyback can be at least partially attenuated and the current $I_{BD}$ can be relatively small. As such, the low-side diode 548(b) can cause a small amount of conduction loss compared to the high-side diode 528(a).

At time $t_7$, the H-bridge converter 302b generates a second phase of the output voltage $V_O$. For example, the H-bridge converter 302b can generate the first phase by switching on the high-side transistor 518(b) of the second half-bridge circuitry 308(b) and switching off the low-side transistor 538(b) of the second half-bridge circuitry 308(b). In the illustrated embodiment, the low-side diode 548(b) of the second half-bridge circuitry 308(b) abruptly turns off while conducting the current $I_{BD}$. As a result, the low-side diode 548(b) of the second half-bridge circuitry 308(b) may create commutation loss.

It should be appreciated that the process of generating the first and second phases as described above can be repeated a number of times.

Based on the simulation results 600, it can be observed that the diodes 528(b), 548(b) of the second half-bridge circuitry 308(b) operate in a way that may create commutation losses. For example, as shown in plot 612, particularly at times $t_4$ and $t_7$, the diodes 528(b), 548(b) experience rapid termination in conduction of $I_{BD}$, which can cause commutation loss. As a result, commutation loss can be decreased by selecting a semiconductor material that has relatively low reverse recovery charge for the diodes 528(b), 548(b).

Still with respect to the diodes 528(b), 548(b) of the second half-bridge circuitry 308(b), during operation the diodes 528(b), 548(b) operate in a manner that can result in relatively low conduction loss. For example, plot 612 shows that the magnitude of current $I_{BD}$ that flows through the diodes 528(b), 548(b) is relatively small. Accordingly, overall efficiencies may be improved by reducing reverse recovery charge, even in some cases where the forward voltage drop increases.

On the other hand, the diodes 528(a), 548(a) of the first half-bridge circuitry 308(a) operate in a way that may create conduction losses. For example, plot 608 shows that at time periods $t_2$-$t_3$ and $t_5$-$t_6$ the diodes 528(a), 548(a) conduct and block relatively large currents $I_{AD}$. Conducting large currents can create conduction losses. Accordingly, it can be desirable to reduce the forward voltage drop of the semiconductor material of the diodes 528(a), 548(a) to reduce conduction loss. Accordingly, in one embodiment, the semiconductor material of the diodes 528(a), 548(a) of the first half-bridge circuitry 308(a) can be chosen to reduce conduction losses.

Still with respect to the diodes 528(a), 548(a) of the first half-bridge circuitry 308(a), during operation the diodes 528(a), 548(a) operate in a manner that can result in relatively low commutation loss. For example, plot 608 shows that the current $I_{AD}$ that flows through the diodes 528(a), 548(a) is not rapidly reversed or shut off. This is because when the first or second phases are switched on, the diodes 528(a), 548(a) are not conducting substantial current $I_{AD}$ and thus do not block substantial current. Accordingly, efficiency can be improved by selecting semiconductor material of the diodes 528(a), 548(a) that has relatively low forward voltage drop, even in some cases where the reverse recovery charge is relatively high.

Figure 7:
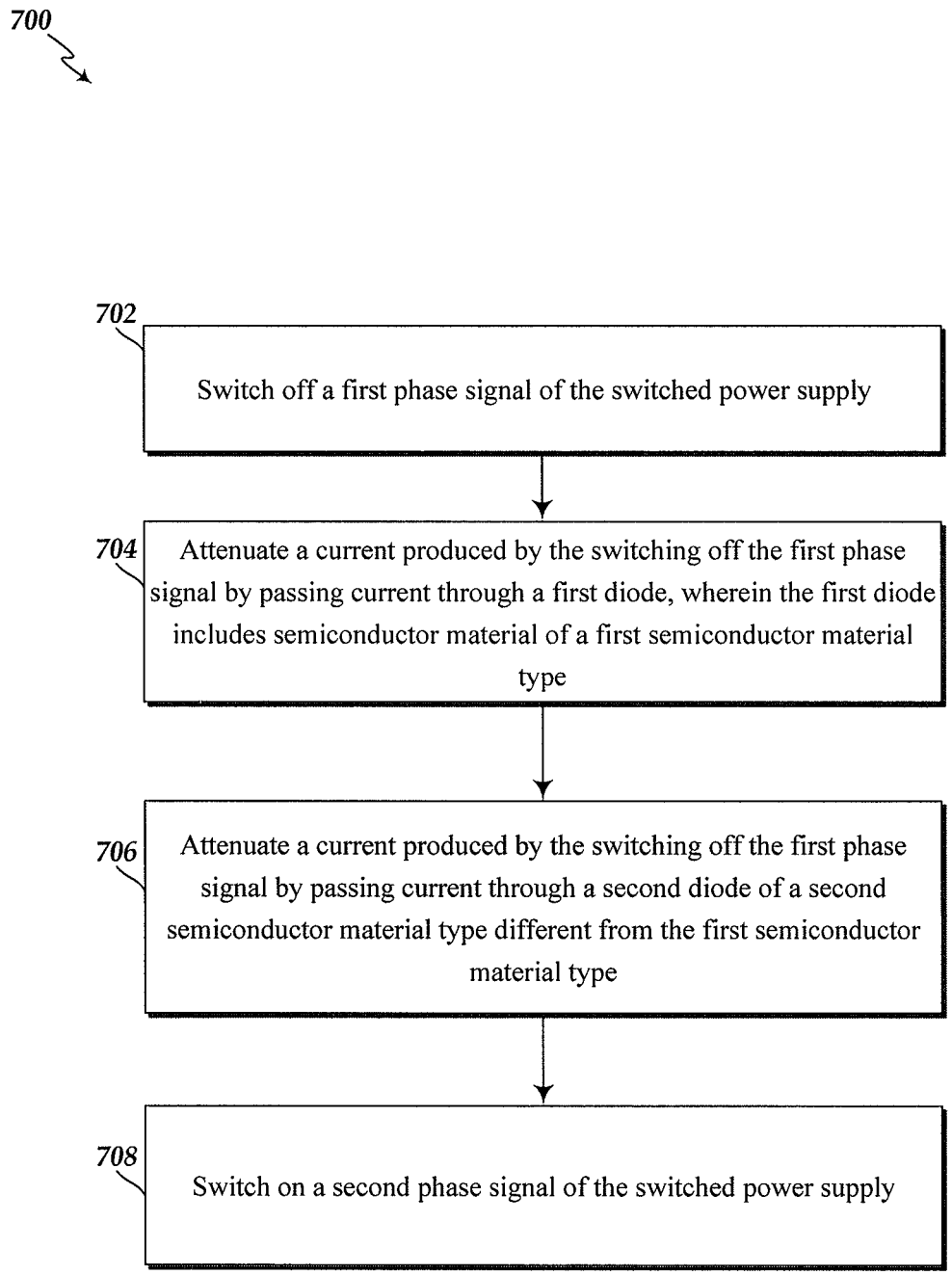
FIG. 7 is a flow diagram of one embodiment of a method of switching the H-bridge of FIG. 5.

FIG. 7 is a flow diagram of one embodiment of a method of switching the H-bridge of FIG. 5. Operation is described with reference to the components of FIG. 5. Additionally, the generation and control of the control signals $V_C$ can be performed by the control and monitoring circuitry 304 of FIG. 3. At block 702, a first phase of a signal is switched off. For example, if the high-side transistor 518(a) is off, the low-side transistor 538(a) is on, the high-side transistor 518(b) is on, and the low-side transistor 538(b) is off, switching off the first phase can correspond to switching on the high-side transistor 518(a) and switching off the low-side transistor 538(a) (for example, as described in connection with time $t_2$ of Figure).

At block 704, a flyback current produced by the switching off the first phase signal is attenuated by passing the flyback current through a first diode, wherein the first diode includes semiconductor material of a first type. Continuing the example of block 702, the flyback can be attenuated by passing the flyback current through the high-side diode 528(a) and the high-side transistor 518(b) as part of a conduction loop (e.g., at time $t_2$-$t_3$ of FIG. 6). The diode 528(a) can include semiconductor material of a first type. In one specific example, the diode 528(a) includes Si. Similarly, the low-side diode 548(a) may also include the semiconductor of the first type, such as Si. As stated, the magnitude of the flyback current may initially be high. Therefore, there may be conduction losses associated with the diodes 528(a), 548(a). Si has a relatively low forward voltage drop, which may reduce conduction loss.

At block 706, the flyback current produced by the switching off the first phase signal is attenuated by passing the flyback current through a second diode, wherein the second diode includes semiconductor material of a second type. Continuing the example of block 704, the flyback can be further attenuated by passing the flyback current through the high-side diode 528(b) and the high-side transistor 518(a) as part of a conduction loop (e.g., at time $t_3$-$t_4$ of FIG. 6). The diode 528(b) can include semiconductor material of a second type. In one specific example, the diode 528(b) includes SiC or GaN. The semiconductors SiC and GaN can have relatively low reverse recovery charge, which may reduce commutation loss. Similarly, the low-side diode 548(b) may also include the semiconductor of the second type, such as SiC or GaN.

At block 708, a second phase signal of the H-bridge converter is switched on. In one embodiment, the second phase signal can be switched on while a second diode conducts flyback. For example, in FIG. 6, at time $t_4$, the diode 528(b) is conducting flyback current when the second phase is switched on by switching on the low-side transistor 538(b) and switching off high-side transistor 518(b). As the plots of FIG. 6 illustrate, the diode 528(b) is conducting current and therefore may experience commutation losses when the second phase output is switched on at time $t_4$ since the current $I_{BD}$ may become rapidly reversed and/or blocked at the time of switching. As stated, in one specific example, the diode 528(b) and/or diode 548(b) can include SiC or GaN. The semiconductors SiC and GaN can have relatively low reverse recovery charge, which may reduce commutation loss.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, an H-bridge circuit can comprise first means for selectively connecting each of a first input power supply and a second input power supply with a first output power supply line (e.g., a half-bridge circuit 308(a) of FIGS. 3-5). The first connecting means can be configured to conduct current using semiconductor material of a first type (e.g., a switching circuitry 310(a) of FIGS. 3-5 and/or switching circuitry 510(a) of FIG. 5). The H-bridge circuit can further comprise second means for selectively connecting each of the first input power supply and the second input power supply with a second output power supply line (e.g., a half-bridge circuit 308(b) of FIGS. 3-5). In some aspects, the second connecting means can be configured to present a greater forward voltage drop than the first connecting means. For example, the first connecting means can be configured to attenuate current caused by on-off connections of the first and second connecting means by conducting the current through one or more flyback diodes (e.g., the diodes 528(a) and/or 548(a)) comprising Si. Additionally, the second connecting means can be configured to attenuate current caused by on-off connections of the first and second connecting means by conducting the current through one or more flyback diodes (e.g., the diodes 528(b) and/or 548(b)) comprising SiC and/or GaN. In particular, SiC and GaN can present greater forward voltage drops than Si. Accordingly, the second connecting means can be configured to conduct current using semiconductor material of a second type (e.g., a switching circuitry 310(b) of FIGS. 3-5 and/or switching circuitry 510(b) of FIG. 5). The first semiconductor material type can be different from the second semiconductor material type (e.g., the first semiconductor material type can correspond to Si, and the second semiconductor material type can correspond to SiC and/or GaN).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An electronic power supply comprising:
 a first half-bridge circuitry comprising:
  a first switching circuit and a second switching circuit, each comprising a plurality of components, having a semiconductor material of a first type;
 a second half-bridge circuitry comprising:
  a third switching circuit and a fourth switching circuit, each comprising a plurality of components having a semiconductor material of a second type;
 a first voltage input; and
 a second voltage input,
 the first and second voltage inputs connected to the first and the second half-bridge circuitries, the second half-bridge circuitry in parallel with the first half-bridge circuitry, and the first semiconductor material type different from the second semiconductor material type.

2. The electronic power supply of claim 1, wherein the semiconductor material of the first type has a lower forward voltage drop than semiconductor material of the second type.

3. The electronic power supply of claim 1, wherein the semiconductor material of the second type has a lower reverse recovery than the semiconductor material of the first type.

4. The electronic power supply of claim 1, wherein the semiconductor material of the first type comprises silicon.

5. The electronic power supply of claim 4, wherein the semiconductor material of the second type comprises at least one of silicon carbide or gallium nitride.

6. The electronic power supply of claim 1, wherein the first half-bridge circuitry and the second half-bridge circuitry each comprises high-side and low-side switch circuitries, wherein the high-side switch circuitry and the low-side switch circuitry of the first half-bridge circuitry include the semiconductor material of the first type, and wherein the high-side switch circuitry and the low-side switch circuitry of the second half-bridge circuitry include the semiconductor material of the second type.

7. The electronic power supply of claim 6, wherein the first half-bridge circuitry and the second half-bridge circuitry each comprises high-side and low-side transistors, wherein the high-side transistor and the low-side transistor of the first half-bridge circuitry include the semiconductor material of the first type, and wherein the high-side transistor and the low-side transistor of the second half-bridge circuitry include the semiconductor material of the second type.

8. The electronic power supply of claim 6, wherein the first half-bridge circuitry and the second half-bridge circuitry each comprises one or more flyback diodes for elimination of flyback caused by the first and second half-bridge circuitries switching, wherein the one or more flyback diodes of the first half-bridge circuitry includes the semiconductor material of the first type, and wherein the one or more flyback diodes of the second half-bridge circuitry includes the semiconductor material of the second type.

9. The electronic power supply of claim 8, wherein the semiconductor material of the first type has a lower forward voltage drop than semiconductor material of the second type.

10. The electronic power supply of claim 8, wherein the semiconductor material of the second type has a lower reverse recovery than the semiconductor material of the first type.

11. The electronic power supply of claim 8, wherein the semiconductor material of the first type is silicon, and the semiconductor of the second type is silicon carbide.

12. The electronic power supply of claim 1, further comprising a base system transmit circuit operatively coupled to at least one of the first half-bridge circuitry or the second half-bridge circuitry, wherein the at least one of the first half-bridge circuitry or the second half-bridge circuitry is configured to provide the base system transmit circuit a power supply for wireless transmission of electromagnetic power.

13. A method for switching an H-bridge circuit, the method comprising:
   switching off a first phase signal of the H-bridge circuit, the H-bridge circuit comprising a first half-bridge circuitry comprising a first switching and a second switching circuits, each comprising a plurality of components having a first semiconductor material type and a second half-bridge circuitry comprising a third switching circuit and a fourth switching circuit, each comprising a plurality of components having a second semiconductor material type, the first semiconductor material type different from the second semiconductor material type;
   attenuating a current produced by the switching off of the first phase signal by passing the current through the first half-bridge circuitry;
   attenuating the current produced by the switching off of the first phase signal by passing the current through the second half-bridge circuitry; and
   switching on a second phase signal of the H-bridge circuit.

14. The method of claim 13, wherein the switching on the second phase signal of the H-bridge circuit is performed while the second half-bridge circuitry conducts the current.

15. The method of claim 13., wherein the semiconductor material of the first type has a lower forward voltage drop than semiconductor material of the second type.

16. The method of claim 15, wherein the semiconductor material of the first type comprises silicon.

17. The method of claim 13, wherein the semiconductor material of the second type has a lower reverse recovery than the semiconductor material of the first type.

18. The method of claim 17, wherein the semiconductor material of the second type comprises at least one of silicon carbide or gallium nitride.

19. The method of claim 13, further comprising providing a base system transmit circuit a power supply based on the switching of the first and second phase signals for wireless transmission of electromagnetic power.

20. An H-bridge power converter for supplying power, the H-bridge power converter comprising:
   first means for selectively connecting each of a first input power supply and a second input power supply to a first output power supply line, the first selectively connecting means comprising first switching means and second switching means, each having a semiconductor material of a first type; and
   second means for selectively connecting each of the first input power supply and the second input power supply to a second output power supply line, the second selectively connecting means comprising third switching means and fourth switching means, each having a semiconductor material of a second type, the first selectively connecting means in parallel with the second selectively connecting means and the second selectively connecting means configured to present a greater forward voltage drop than the first selectively connecting means.

* * * * *